United States Patent
Smith et al.

(10) Patent No.: US 10,372,978 B1
(45) Date of Patent: Aug. 6, 2019

(54) ARTIFICIAL INTELLIGENCE IMAGE AND TEXT PROCESSING

(71) Applicant: UIPCO, LLC, San Antonio, TX (US)

(72) Inventors: Arthur Quentin Smith, Fredericksburg, TX (US); John C. Hopkins, III, San Antonio, TX (US)

(73) Assignee: UIPCO, LLC, San Antonio, TX (US)

( * ) Notice: Subject to any disclaimer, the term of this patent is extended or adjusted under 35 U.S.C. 154(b) by 68 days.

(21) Appl. No.: 15/816,769

(22) Filed: Nov. 17, 2017

Related U.S. Application Data

(60) Provisional application No. 62/423,296, filed on Nov. 17, 2016.

(51) Int. Cl.
*G06K 9/00* (2006.01)
*G06K 9/62* (2006.01)
*G06N 3/08* (2006.01)

(52) U.S. Cl.
CPC ..... *G06K 9/00369* (2013.01); *G06K 9/00718* (2013.01); *G06K 9/6217* (2013.01); *G06K 2209/01* (2013.01); *G06K 2209/21* (2013.01); *G06K 2209/25* (2013.01); *G06N 3/08* (2013.01)

(58) Field of Classification Search
CPC ...... G06Q 10/06; G06Q 10/063; G06Q 20/10; G06Q 20/4016; G06Q 30/02; G06Q 30/0601; G06Q 50/01; Y04S 10/54
See application file for complete search history.

(56) References Cited

U.S. PATENT DOCUMENTS

2013/0073387 A1* 3/2013 Heath ............... G06Q 50/01
  705/14.53
2019/0073647 A1* 3/2019 Zoldi ............... G06Q 20/10

* cited by examiner

*Primary Examiner* — Manuchehr Rahmjoo
(74) *Attorney, Agent, or Firm* — Joseph A. Fuchs; Greensfelder, Hemker & Gale, P.C.

(57) ABSTRACT

The present invention provides a method using a trained and activated artificial intelligence entity for detecting in photo images, moving or still, the identity of target people who are present or former members of the U.S. armed services, or are related thereto, from sources available through the Internet or other wide area computer network.

9 Claims, 2 Drawing Sheets

ARTIFICIAL INTELLIGENCE IMAGE AND TEXT PROCESSING

CROSS-REFERENCE TO RELATED APPLICATIONS

The present application claims the benefit of the filing date of U.S. Provisional Patent Application Ser. No. 62/423,296 filed Nov. 17, 2016, and is incorporated herein by reference.

FEDERALLY SPONSORED RESEARCH OR DEVELOPMENT

N/A

FIELD OF THE INVENTION

The present invention provides a system and a method for implementing an artificial intelligence (AI) entity for analyzing data files representative of images of people and determining members of the armed services and friends and relations.

DESCRIPTION OF THE PRIOR ART

There are numerous businesses who provide goods and services predominately or exclusively to present or former members of the armed services. Thus, it is desirable to identify such people to approach them for the sales of goods and/or services.

SUMMARY OF THE INVENTION

The present invention provides a method of using a trained and activated artificial intelligence entity for detecting language, text and audio in photo images, moving or still, the identity of target people who are present or former members of the U.S. armed services, or are related thereto, from sources available through the Internet or other wide area computer network. Social media is ripe with photo images for analysis using the activated AI entity. The method includes the steps of: (1) implementing an artificial intelligent (AI) entity on a server having a processor, a memory and computer readable instructions in the memory; (2) training the AI entity to locate photo images on the Internet, (3) training the AI entity to identify people wearing military uniforms and/or using military language, (4) training the AI entity to find the name of the people wearing the military uniforms, (5) training the AI to find relatives of the people wearing military uniforms and/or using military language, and (6) storing pertinent information of those identified in a database.

BRIEF DESCRIPTION OF THE DRAWINGS

To understand the present invention, it will now be described by way of example, with reference to the accompanying drawings in which.

DETAILED DESCRIPTION

Figure 1:
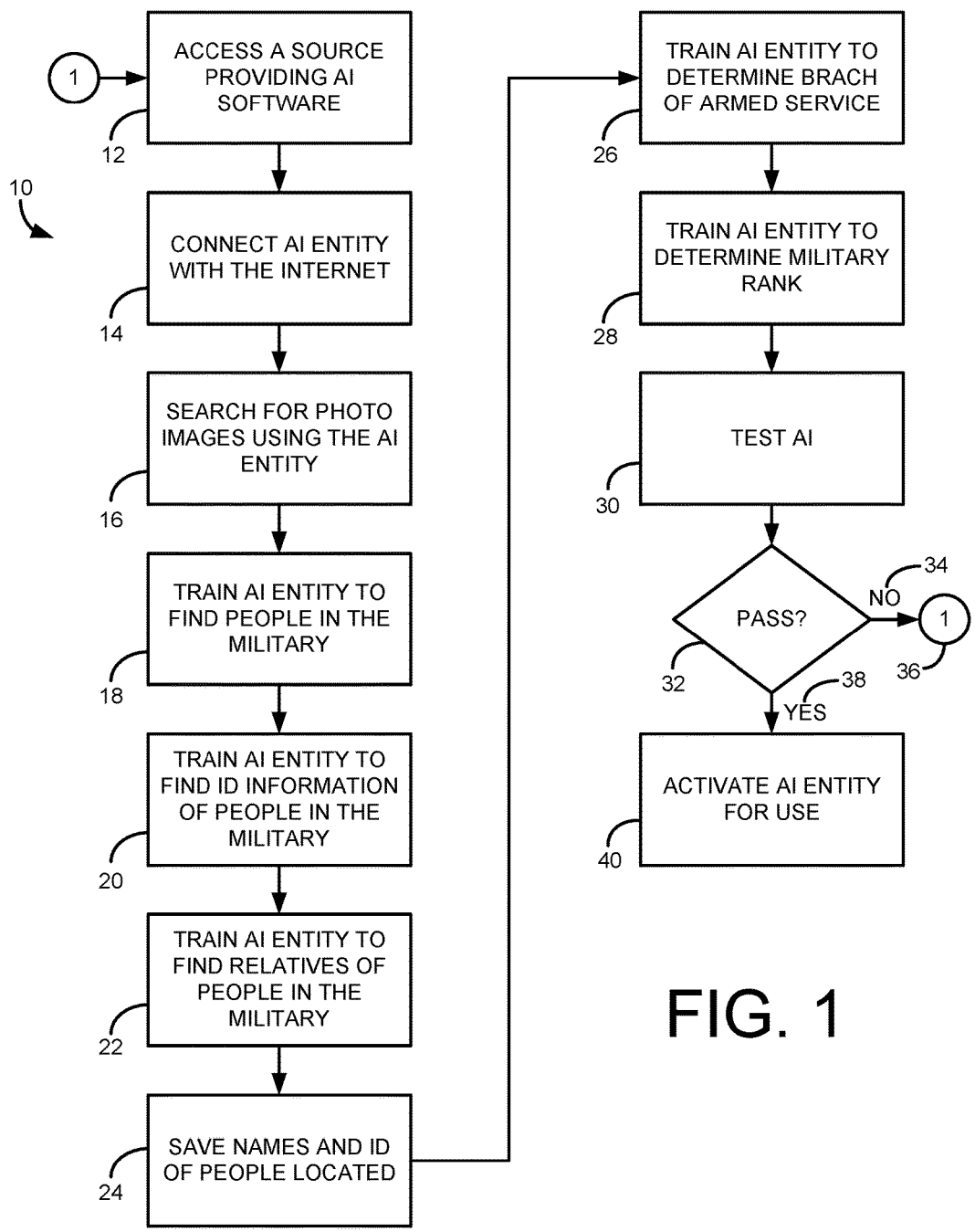
FIG. 1 is a flow chart of a method for training an artificial intelligence entity to locate people in photo images or videos of people in the military.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

For businesses whose principal focus is to provide goods and services to past and current members of the United States armed services and certain relatives of these people, it is important to locate such people as prospects for purchasing goods and services. There are no comprehensive, publically available databases showing former and active members of the U.S. armed services. The U.S. armed services include the Army, Air Force, Navy, Marines, National Guard and Coast Guard. Members and former members of the armed services can be a customer of financial firms and purchase insurance, banking and investment products and advice. Some firms focus purely on serving former and current members of the U.S. armed services and providing excellent service to its customers. To develop sales leads it is desirable to search the Internet for photo images, either still or moving, of people in the military and their relatives. Spouses and children of former or current members of the U.S. armed services are also eligible to become customers. Thus, it is also important to find such relatives as prospects for the sale of products and services. To this end, the present invention provides a method for training an AI entity to scan through text, video and photo images located on the Internet to identify indicia of a military setting. Such indicia can include, for example, people wearing a military uniform of the U.S. armed forces, the use of military languages and terms (e.g., TDY, PCS, PX, army brat, base, fort, and ship names), military buildings, military equipment, military weapons, signage, military-style haircuts, common military tattoos, runways, fences, flags and other common indicia of a military setting or military personnel. Upon indicating a military setting, the images can be further analyzed to identify any people in the images and then to determine the name of the person and any identifying information available about the person. Social media including Facebook, LinkedIn, SnapChat, military blogs, and numerous other web sites, are ripe for identifying prospective customers.

FIG. 1 shows the steps of a method 10 for training an AI entity to develop a list of sales leads for a company that principally provides goods and services to former and current members of the U.S. armed services, and selected relations such as spouses, children, grandchildren for example. The AI entity can be trained to look for any relation one wishes including more distant relatives such as aunts, uncles, cousins, in-laws, etc., of the armed services members. The method 10 includes the steps of accessing a source providing artificial intelligence (AI) software 12 to develop and train an AI entity. Connecting the AI entity to the Internet 14, to search for photo/video images 16 on the Internet to locate military indicia set forth above. Upon finding such indicia in an image, locating identifying information of the people in the image that are members of the military and their relations 22, and saving this information 24 in a database. The AI entity will be trained to determine from the photo/video images the particular branch of the U.S. armed services of the military people identified, and the persons rank. After the training the AI entity must be tested and if the AI entity does not pass the test 34 continuing the training 36. If the AI entity passes the test 38 then the AI entity is activated for commercial use 40. A testing protocol can be implemented to include numerous tests to ensure the AI entity is ready for commercial use.

Suitable artificial intelligence software is available for public access through open source AI platforms like Caffe, Torch and Theano who provide businesses access to powerful neural networks for processing of their information by AI techniques like deep learning, reinforcement learning and logistic regression. Additionally, Google, Elon Musk, and Facebook are offering open source access to their AI programs: TensorFlow, OpenAI, and BigSur, respectively. All of these AI systems process enormous amounts of data, for example Caffe can process over 60 million images per day with a single NVIDIA K40 GPU (that's 1 ms/image for inference and 4 ms/image for learning).

The step of training the AI entity to search for photo/video images on the Internet includes exposing the AI entity to photo/video images on a webpage and repeating the process numerous times. The step of training the AI entity to locate military indicia, such as people wearing military uniforms includes exposing the AI entity to numerous photo images of people wearing various military uniforms, to show what a successful outcome is for a search. Similar steps can be taken for other military indicia mentioned above. Military uniforms could be determined by the era (e.g., Vietnam, WW2, etc.), color, style, pattern, presence of a hat, shape of the hat, rank bearing indicia, and helmet type to name a few distinguishing features. Distinguishing features of a uniform can also be used to identify the branch of the armed services. Uniforms will often identify by name e.g., ARMY or bear an insignia of the branch. The AI entity can be trained to focus on specific portions of clothing such as the left breast of a jacket, right breast for name plate, shirt or jacket sleeves, shirt or jacket collar tabs, visor of hat, and shoulders of jacket to name a few. Other military indicia such as signage can also assist in identifying a branch of the armed services as well as military bases and equipment can be unique to a branch of the armed services.

Figure 2:
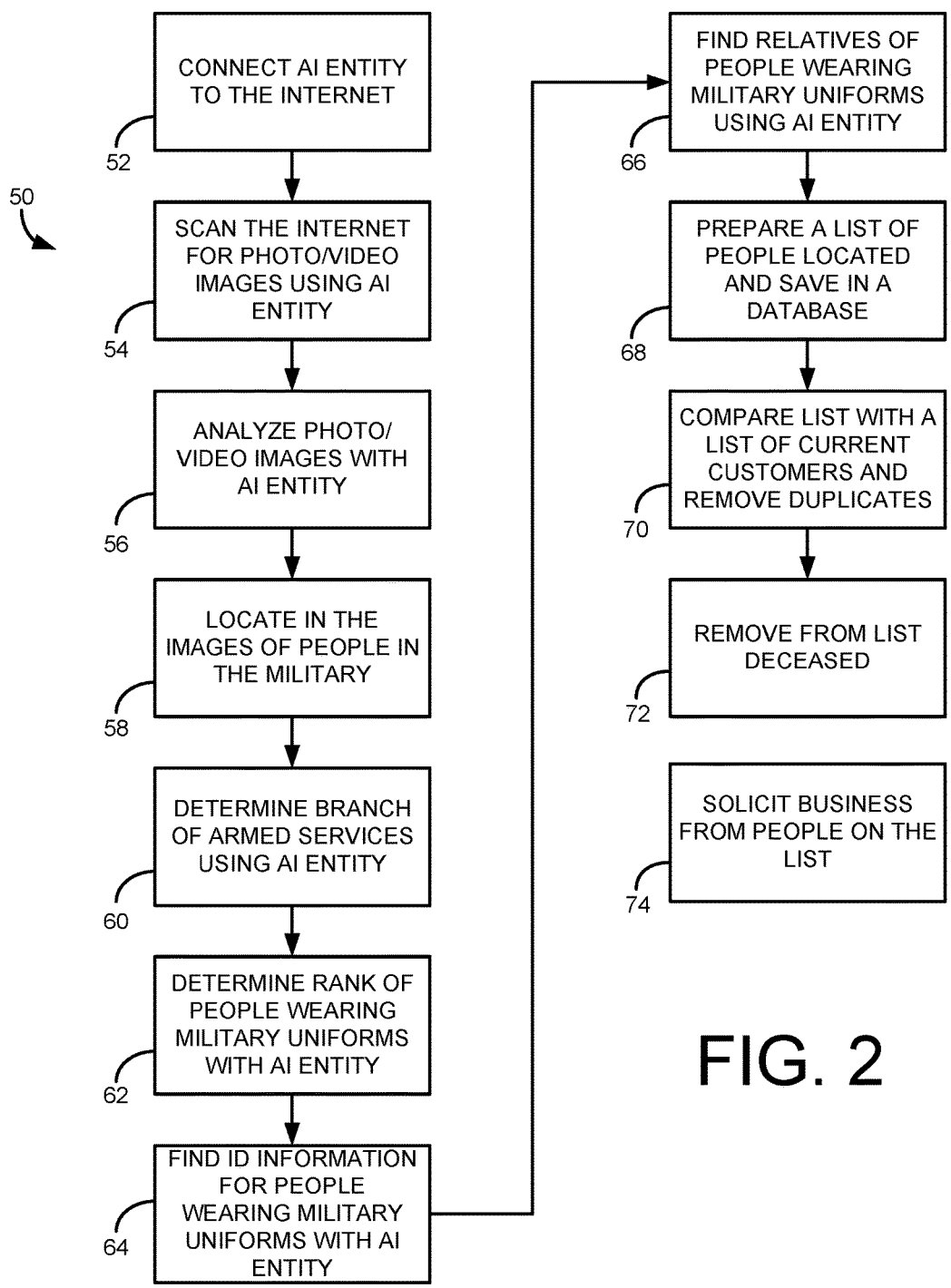
FIG. 2 is a flow chart of a method of using an activated AI entity to scan the Internet for photo images and to analyze the images for people in the military.

FIG. 2 shows a method 50 for using the activated AI entity for commercial use. In step 52 the activated AI entity is connected to the Internet 52, and the activated AI entity scans 54 websites looking for language, text and audio in image files or video files. These files can be identified in one exemplary embodiment by their file extensions such as .tiff, .jpeg, mpeg, .gif, and numerous others well known to those of ordinary skill in the art. Upon locating a candidate image file the activated AI entity analyzes 56 the image for military indicia. Upon finding such military indicia, the image is further analyzed to locate people in the images. The images of the people are then analyzed to determine if they bear any military indicia such as a uniform, tattoo, military-style haircut and the like. Upon locating such person, the image is analyzed to determine if the person is wearing a military uniform, and if so, the name, rank 62, and branch 60 of the service of the person as well as identifying information 64. Identifying information includes the name, rank, address, marital status, family members, where stationed, email address, etc.

In step 66 the activated AI entity seeks out relatives of the people wearing uniforms using the identifying information and expanding to find people that are related and the type of relation e.g., spouse, child, grandchild, sibling, cousin, uncle, aunt, in-law, etc. In step 68 all of the information gathered is stored in a database. A company will have a list of its present customers and can remove those customer names 70 from those in the database identified as prospects. The names in the database can also be compared to names on websites identifying the deceased 72 and removing the names of the deceased from the names in the database. Upon establishing a reliable list of prospects, solicitations can be sent 74 to the prospects for the sale of goods and services.

The AI entity could also be trained to look for other indicia of other persons of interest. For example, the AI entity could be trained to identify medical indicia to locate medical personnel such as doctors, nurses, medics, etc. Another example would be training the AI entity to identify first responders such as police officers, firemen, EMTs, etc.

Thus, the present invention provides a method for identifying people in the military from language, text, and audio in photo/video images. The steps include: (1) implementing an artificial intelligent (AI) entity on a server having a processor, a memory and computer readable instructions in the memory; (2) training the AI entity to locate language, text and audio in photo images on the Internet; (3) training the AI entity to identify military indicia in the photo images; (4) training the AI entity to locate people in the images bearing military indicia; (5) training the AI entity to determine whether the people located are members of the military; (6) training the AI entity to determine the name of the people identified as being members of the military; (7) training the AI entity to find relatives of the people identified as being members of the military; (8) testing the AI entity by presenting the AI entity with data representing a plurality of photo images containing a predetermined number of people in the military; (9) activating the AI entity for commercial use after successful testing; (10) connecting the AI entity to the Internet; (11) initiating a scan of the Internet and/or other information sources by the AI entity to locate a plurality of photo images; (12) analyzing the plurality of language, text and audio in photo images using the AI entity to locate people in the military; (13) locating the names of the people determined to be in the military; (14) locating the names of people who are related to the people determined to be in the military; and (15) saving the names of the people determined to be in the military and their relatives in a first database.

In one embodiment, the step of determining whether people are in the military includes the step of identifying a military uniform with the activated AI entity, determining the rank of the people wearing the military uniform with the activated AI entity.

The step of initiating a scan of the Internet comprises, for example, logging on to facebook.com, scanning through photo images posted with the activated AI entity and locating a person wearing a military uniform and determining people who are designated as friends of the person wearing the military uniform. The step can include scanning other social media sites such as LinkedIn.

The step of determining the branch of the military service can be accomplished, for example, using the activated AI entity to compare images of people wearing uniforms with images of known uniforms of the U.S. Army, U.S. Marines, U.S. Navy, U.S. Air Force, U.S. National Guard and U.S. Coast Guard. The step of determining the rank of the person wearing the military uniform includes, for example, using the activated AI entity to identify indicia of rank from the photo image of the person wearing the military uniform and comparing the identified indicia to the known indicia of rank used by the U.S. Army, U.S. Marines, U.S. Navy, U.S. Air Force, U.S. National Guard and U.S. Coast Guard.

The method can further include the step of using a second database of customers of a company and comparing the names of the people wearing military uniforms in the first database with the names of customers in the second database and removing the matching names from the first database to exclude current customers. Names of the deceased can also be eliminated by comparing the people located with names in a social security death benefits website and upon finding matches removing the matching names from the first database.

Many modifications and variations of the present invention are possible in light of the above teachings. It is, therefore, to be understood within the scope of the appended claims the invention may be protected otherwise than as specifically described.

We claim:

1. A method for identifying people in the military from language, text, and audio in photo images comprising:
    implementing an artificial intelligent (AI) entity on a server having a processor, a memory and computer readable instructions in the memory;
    training the AI entity to locate language, text and audio in photo images on the Internet;
    training the AI entity to identify military indicia in the photo images;
    training the AI entity to locate people in the images bearing military indicia;
    training the AI entity to determine whether the people located are members of the military;
    training the AI entity to determine the name of the people identified as being members of the military;
    training the AI entity to find relatives of the people identified as being members of the military;
    testing the AI entity by presenting the AI entity with data representing a plurality of photo images containing a predetermined number of people in the military;
    activating the AI entity for commercial use after successful testing;
    connecting the AI entity to the Internet;
    initiating a scan of the Internet and/or other information sources by the AI entity to locate a plurality of photo images;
    analyzing the plurality of language, text and audio in photo images using the AI entity to locate people in the military;
    locating the names of the people determined to be in the military;
    locating the names of people who are related to the people determined to be in the military; and
    saving the names of the people determined to be in the military and their relatives in a first database.

2. The method of claim 1 wherein the step of determining whether people are in the military includes the step of identifying a military uniform with the activated AI entity.

3. The method of claim 2 further comprising the step of determining the rank of the people wearing the military uniform with the activated AI entity.

4. The method of claim 3 wherein the step of determining the rank of the person wearing the military uniform comprises using the activated AI entity to identify indicia of rank from the photo image of the person wearing the military uniform and comparing the identified indicia to the known indicia of rank used by the U.S. Army, U.S. Marines, U.S. Navy, U.S. Air Force, U.S. National Guard and U.S. Coast Guard.

5. The method of claim 2 wherein the step of determining the branch of the military service comprises using the activated AI entity to compare images of people wearing uniforms with images of known uniforms of the U.S. Army, U.S. Marines, U.S. Navy, U.S. Air Force, U.S. National Guard and U.S. Coast Guard.

6. The method of claim 1 wherein the step of initiating a scan of the Internet comprises logging on to facebook.com, scanning through photo images posted with the activated AI entity and locating a person wearing a military uniform and determining people who are designated as friends of the person wearing the military uniform.

7. The method of claim 1 wherein the step of initiating a scan of the Internet comprises logging on to linkedin.com, scanning through photo images posted with the activated AI entity and locating a person wearing a military uniform and determining people who are linked to the person wearing the military uniform.

8. The method of claim 1 further comprising a second database of customers of a company and comparing the names of the people wearing military uniforms in the first database with the names of customers in the second database and removing the matching names from the first database.

9. The method of claim 1 further comprising using the activated AI entity to compare the names in the first database with names in a social security death benefits website and upon finding matches removing the matching names from the first database.

* * * * *